(12) United States Patent
Bi et al.

(10) Patent No.: US 11,640,607 B2
(45) Date of Patent: May 2, 2023

(54) SIGNATURE PANEL FOR ID DOCUMENTS AND PAYMENT CARDS

(71) Applicant: Idemia Identity & Security USA LLC, Billerica, MA (US)

(72) Inventors: Daoshen Bi, Boxborough, MA (US); Robert L. Jones, Andover, MA (US); William M. O'Connor, Derry, NH (US); Yecheng Wu, Lexington, MA (US)

(73) Assignee: IDEMIA IDENTITY & SECURITY USA LLC, Billerica, MA (US)

( * ) Notice: Subject to any disclaimer, the term of this patent is extended or adjusted under 35 U.S.C. 154(b) by 4 days.

(21) Appl. No.: 17/238,089

(22) Filed: Apr. 22, 2021

(65) Prior Publication Data

US 2021/0334803 A1 Oct. 28, 2021

Related U.S. Application Data

(60) Provisional application No. 63/014,881, filed on Apr. 24, 2020, provisional application No. 63/014,875, filed on Apr. 24, 2020.

(51) Int. Cl.
  *G06Q 20/40* (2012.01)
  *G06Q 20/34* (2012.01)
  *G06K 19/02* (2006.01)

(52) U.S. Cl.
  CPC ........... *G06Q 20/401* (2013.01); *G06K 19/02* (2013.01); *G06Q 20/34* (2013.01)

(58) Field of Classification Search
  None
  See application file for complete search history.

(56) References Cited

U.S. PATENT DOCUMENTS

2018/0099521 A1* 4/2018 Wu ...................... B42D 25/309

* cited by examiner

*Primary Examiner* — Kristy A Haupt
(74) *Attorney, Agent, or Firm* — Nixon & Vanderhye, PC

(57) ABSTRACT

An identification document includes a card structure including a plastic material, a surface of the card structure including a first surface region that includes a plurality of depressions formed in the surface according to a predefined pattern; and a second surface region that includes a majority of a surface area of the identification document, wherein the second surface region is non-porous. A surface energy of the surface in the first surface region is greater than a surface energy of the surface in the second surface region.

9 Claims, 11 Drawing Sheets

SIGNATURE PANEL FOR ID DOCUMENTS AND PAYMENT CARDS

CROSS-REFERENCE TO RELATED APPLICATIONS

This application claims the benefit of the filing dates of U.S. Patent Application Ser. No. 63/014,881, entitled "Signature Panel for Payment Cards" and filed on Apr. 24, 2020, and U.S. Patent Application Ser. No. 63/014,875, entitled "Signature Panel for ID Documents" and filed on Apr. 24, 2020, the entire contents of each of which are incorporated by reference herein.

TECHNICAL FIELD

This disclosure generally relates to identification ("ID") documents and payment cards including signature panel formed in the ID document or payment card.

BACKGROUND

Identification ("ID") documents and payment cards play a critical role in today's society. One example of an ID document is an ID card. ID documents are used on a daily basis to prove identity, to verify age, to access a secure area, to evidence driving privileges, to cash a check, and so on. Airplane passengers are required to show an ID document during check in, security screening, and prior to boarding their flight. One example of a payment card is a bank card. Payment cards are used on a daily basis to access and deposit money, conduct purchases, exchange money, and so on.

SUMMARY

In a general aspect, innovative aspects of the subject matter described in this specification can be embodied an identification document that includes a card structure including a plastic material. A surface of the card structure includes a first surface region that includes a plurality of depressions formed in the surface according to a predefined pattern, and a second surface region that includes a majority of a surface area of the identification document, wherein the second surface region is non-porous. A surface energy of the surface in the first surface region is greater than a surface energy of the surface in the second surface region.

Implementations of the general aspect may include one or more of the following features.

In some implementations, the pattern is based on pixels in a digital grayscale image.

In some implementations, the pattern defines one or more items of personalized data to be formed within the first surface region.

In some implementations, the personalized data identifies a bearer of the identification document.

In some implementations, the personalized data corresponds to one or more initials of a bearer of the identification document.

In some implementations, the first surface region is rectangular and the personalized data is positioned within a corner of the first surface region.

In some implementations, the depressions are about 8 micrometers to about 22 micrometers deep compared to the second surface.

In some implementations, a surface tension of the surface in the first surface region is greater than a surface tension of the surface in the second surface region.

In some implementations, the card structure is a multilayer laminate document, and the surface of the card structure includes an outer layer of the multilayer laminate document.

In another general implementation, innovative aspects of the subject matter described in this specification can be embodied in methods for forming a signature panel in a surface of an identification document, the methods being executed by one or more processors and including the actions of generating, by the one or more processors, a digital grayscale image defining a pixel pattern, and causing, by the one or more processors, irradiation of the surface of the identification document using the digital grayscale image as a guide to form a signature panel in the surface of the identification document.

Implementations of the general aspect may include one or more of the following features.

In some implementations, causing irradiation of the surface of the identification document includes ablating one or more regions of the surface of the identification document.

In some implementations, causing irradiation of the surface of the identification document includes applying laser irradiation to one or more regions of the surface of the identification document.

In some implementations, wherein using the digital grayscale image as a guide to form a signature panel in the surface of the identification document includes irradiating one or more regions of the surface of the identification document corresponding to a subset of pixels of the digital grayscale image.

In some implementations, wherein using the digital grayscale image as a guide to form a signature panel in the surface of the identification document includes irradiating one or more regions of the surface of the identification document corresponding to pixels of the digital grayscale image identified as dark.

In some implementations, using the digital grayscale image as a guide to form a signature panel in the surface of the identification document includes irradiating one or more regions of the surface of the identification document corresponding to pixels of the digital grayscale image identified as black.

In some implementations, using the digital grayscale image as a guide to form a signature panel in the surface of the identification document includes irradiating a first region of the surface using a first level of energy, the first region corresponding to a first subset of pixels of the digital grayscale image identified as first color, and irradiating a second region of the surface using a second level of energy, the second region corresponding to a second subset of pixels of the digital grayscale image identified as second color.

In some implementations, irradiation of the surface of the identification document forms one or more depressions in a region of the surface of the identification document corresponding to the signature panel.

In some implementations, the one or more depressions are configured to receive ink applied to the signature panel.

In some implementations, irradiation of the surface of the identification document increases an effective surface area of a region of the surface of the identification document corresponding to the signature panel.

In some implementations, irradiation of the surface of the identification document causes oxidation of a region of the surface of the identification document corresponding to the signature panel.

In some implementations, irradiation of the surface of the identification document increases a surface tension of a region of the surface of the identification document corresponding with the signature panel.

The details of one or more embodiments of the subject matter described in this specification are set forth in the accompanying drawings and the description below. Other features, objects, and advantages of the subject matter will be apparent from the description and drawings, and from the claims.

DETAILED DESCRIPTION

Figure 1A:
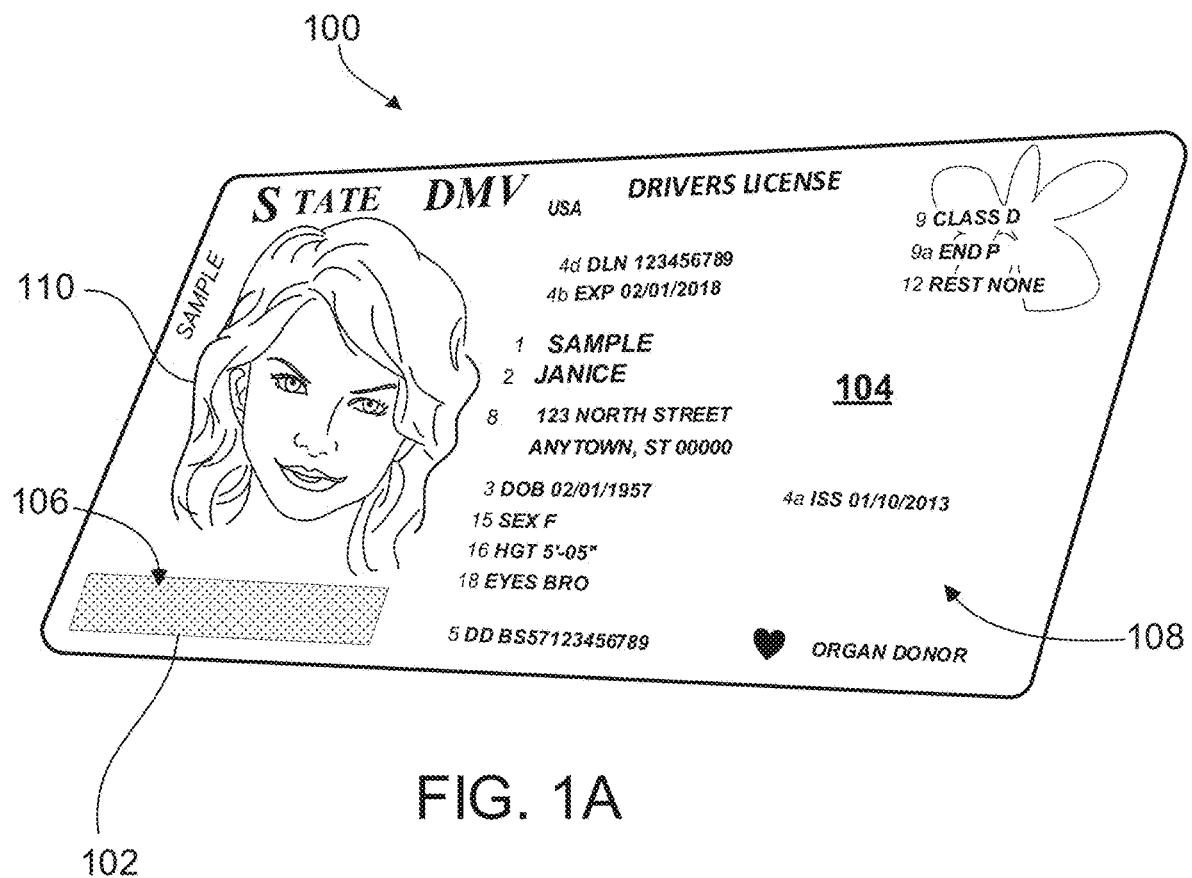
FIGS. 1A-1E depict an ID document with a signature panel formed in a surface of the ID document.

Implementations of the present disclosure include documents, including identification (ID) documents and payment cards, with signature panels formed in the surface of the document. As described in further detail herein, the signature panels define a plurality of depressions in the surface of the document that are configured to receive and retain ink markings applied to the surface of the document. In some examples, the signature panel can include additional information to provide further credentialing of the document.

In addition, implementations of the present disclosure also include methods for generating signature panels on documents, including ID documents and payment cards. The processes described herein generate signature panels that effectively receive and retain ink signatures or markings applied to the signature panels.

As efforts to counterfeit ID documents and payment cards have become more sophisticated, affixing a signature of the document holder to the document has become increasingly important for verification and fraud detection. ID documents and payment cards often include a signature panel for receiving and displaying the signature of the document holder (i.e., the "bearer" of the ID document or payment card). Signature panels are typically formed on ID documents and payment cards by applying a tape or a coating to the surface of the document. However, due to the low surface energy and smoothness of the tapes and coatings, these types of signature panels are often difficult to write on and fail to preserve signatures or other ink markings long-term. In contrast, the signature panels described herein include a plurality of depressions formed in the surface of the document, which provide a region of the surface with an increased surface energy and altered surface topology for improved retention of ink markings applied to the surface.

To further improve security and combat counterfeiting, additional features may be needed for secure credentialing. For example, signature panels formed by using the processes described herein allow for personalized credentials to be added to an ID document or payment card in a manner that is difficult to reproduce without sophisticated equipment and materials. This personalization feature provides an additional security measure to identify counterfeit documents and increases the difficulty associated with making a forgery. Signature panels generated using the methods described herein may include portraits, text, graphical patterns, images, and the like, and may be printed at any location on a document.

Physical ID documents and payment cards described herein are suitable for Dye Diffusion Thermal Transfer (D2T2) personalization, laser (e.g., YAG and $CO_2$) personalization, or both. These ID documents and payment cards may be "over-the-counter" documents or "central issue" documents, and may be personalized in either process. The documents may have transparency enhancement properties.

As used herein, "ID document" is broadly defined and intended to include all types of ID documents, including, documents, magnetic disks, smart cards (e.g., cards that include one more semiconductor chips, such as memory devices, microprocessors, and microcontrollers), contact cards, contactless cards, proximity cards (e.g., radio frequency (RFID) cards), passports, driver licenses, network access cards, employee badges, security cards, visas, immigration documentation, national ID cards, citizenship cards, social security cards, security badges, certificates, identification cards or documents, voter registration and/or identification cards, police ID cards, border crossing cards, security clearance badges and cards, legal instruments, handgun permits (e.g., concealed handgun licenses (CHL)), badges, membership cards or badges, and tags. Also, the terms "document," "card," "badge" and "documentation" are used interchangeably throughout this disclosure.

ID documents such as driver licenses can contain information such as a photographic image, a bar code (which may contain information specific to the person whose image appears in the photographic image, and/or information that is the same from ID document to ID document), variable personal information, such as an address, signature, and/or birthdate, biometric information associated with the person whose image appears in the photographic image (e.g., a fingerprint), a magnetic stripe (which, for example, can be on the side of the ID document that is opposite the side with the photographic image), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

As used herein, "payment card" is broadly defined and intended to include all types of payment cards, including, credit cards, bank cards, phone cards, stored value cards, prepaid cards, smart cards (e.g., cards that include one more semiconductor chips, such as memory devices, microprocessors, and microcontrollers), contact cards, contactless cards, proximity cards (e.g., radio frequency (RFID) cards), debit cards, certificates, legal instruments, gift certificates or cards, membership cards or badges, and tags. Also, the terms "document," "card," "badge" and "documentation" are used interchangeably throughout this disclosure. In addition, payment card can include any item of value (e.g., currency, bank notes, and checks) where authenticity of the item is important, where counterfeiting or fraud is an issue, or both.

Payment cards, such as bank cards, can contain information such as a photographic image, a bar code (which may contain information specific to the person whose image appears in the photographic image, and/or information that is the same from payment card to payment card), variable personal information, such as a signature, biometric information associated with the person whose image appears in the photographic image (e.g., a fingerprint), a magnetic stripe (which, for example, can be on the side of the payment card that is opposite the side with the photographic image), an expiration date, an account number, and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

As used herein, "identification" at least refers to the use of an ID document or payment card to provide identification and/or authentication of a user and/or the respective ID document or payment card itself. For example, in a driver's license, one or more markings or signatures affixed to the document are intended to provide verification of the identity of the authorized holder of the card. In a bank card, one or more markings or signatures affixed to the payment card can be intended to provide verification of the identity of the authorized holder of the card Further, in at least some implementations, "identification" and "authentication" are intended to include (in addition to the conventional meanings of these words), functions such as recognition, information, decoration, and any other purpose for which an indicia can be placed upon an article in the article's raw, partially prepared, or final state. Also, in addition to ID documents and payment cards, techniques described herein can be employed with product tags, product packaging, business cards, bags, charts, maps, labels, and the like, particularly those items including marking of a laminate or over-laminate structure. "ID document" and "payment card" are thus broadly defined herein to include these tags, labels, packaging, cards, etc.

"Personalization," "personalized data," and "variable" data are used interchangeably herein, and refer at least to data, characters, symbols, codes, graphics, images, and other information or markings, whether human readable or machine readable, that is (or can be) "personal to" or "specific to" a specific cardholder or group of cardholders. Personalized data can include data that is unique to a specific cardholder (such as biometric information, image information, serial numbers, Social Security Numbers, privileges a cardholder may have, etc.), but is not limited to unique data. Personalized data can include some data, such as names, initials, birthdate, height, weight, eye color, address, etc., that are personal to a specific cardholder but not necessarily unique to that cardholder (for example, other cardholders might share the same personal data, such as birthdate or initials). In at least some implementations, personal/variable data can include some fixed data, as well. For example, in at least some implementations, personalized data refers to any data that is not pre-printed onto a document in advance, so such personalized data can include both data that is cardholder-specific and data that is common to many cardholders. Variable data can, for example, be printed on an information-bearing layer of the document using thermal printing ribbons and thermal printheads. Personalized and/or fixed data is also intended to refer to information that is (or can be) cross-linked to other information on the document or to the document's issuer. For example, personalized data may include an account number, a security code, an expiration date, a lot number, inventory control number, manufacturing production number, serial number, etc. Such personalized or fixed data can, for example, indicate the lot or batch of material that was used to make the ID document or payment card, what operator and/or manufacturing station made the ID document or payment card and when, etc.

The terms "indicium" and "indicia" as used herein cover not only markings suitable for human reading, but also markings intended for machine reading, and include (but are not limited to) characters, symbols, codes, graphics, images, etc. Especially when intended for machine reading, such an indicium need not be visible to the human eye, but may be in the form of a marking visible only under infra-red, ultra-violet or other non-visible radiation. Thus, in at least some implementations, an indicium formed on any layer in an ID document or payment card may be partially or wholly in the form of a marking visible only under non-visible radiation. Markings including, for example, a visible "dummy" image superposed over a non-visible "real" image intended to be machine read may also be used.

"Laminate" and "overlaminate" include (but are not limited to) film and sheet products. Laminates usable with at least some embodiments include those which contain substantially transparent polymers or which have substantially transparent polymers as a part of their structure. Examples of suitable laminates include at least polyester, polycarbonate (PC), polystyrene, cellulose ester, polyolefin, polysulfone, or polyamide. Laminates can be made using either an amorphous or biaxially oriented polymer as well. A laminate can comprise a plurality of separate laminate layers, for example a boundary layer, a film layer, or both.

The degree of transparency of the laminate can, for example, be dictated by the information contained within the ID document or payment card, the particular colors and/or security features used, etc. The thickness of the laminate layers is not critical, although in some embodiments it may be preferred that the thickness of a laminate layer is greater than 0.5 mil. Types and structures of the laminates described herein are provided only by way of example, those skilled in the art will appreciate that many different types of laminates are suitable.

For example, in ID documents and payment cards, a laminate can provide a protective covering for printed substrates and provides a level of protection against unauthorized tampering (e.g., a laminate would have to be removed to alter the printed information and then subsequently replaced after the alteration). The material(s) from which a laminate is made may be transparent, but need not be. Laminates can include synthetic resin-impregnated or coated base materials composed of successive layers of material, bonded together via heat, pressure, or both. As described herein, laminates may be fused polycarbonate structures formed in the absence of adhesives. Laminates also include security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxies.

In some examples, ID documents and payment cards can be made of various materials (e.g., TESLIN-core, multi-layered ID documents) and fused polycarbonate structures. Implementations disclosed herein can be applied to many ID document and payment card materials formed in many different ways. For example, implementations can be applied to ID document materials and payment card materials including, but not limited to, a laminate and/or coating, articles formed from plastic, paper, wood, cardboard, paperboard, glass, metal, fabric, ceramic, rubber, along with many man-made materials, such as microporous materials, single phase materials, two phase materials, coated paper, synthetic paper (e.g., TYVEC, manufactured by DuPont), foamed polypropylene film (including calcium carbonate foamed polypropylene film), plastic, polycarbonate, poly olefin, polyester, polyethylene terephthalate (PET), PET-G, PET-F, and polyvinyl chloride (PVC), and combinations thereof. In some implementations, the ID document or payment card is formed of a polymeric material that includes oxygen in the backbone of the chemical structure of the material.

In some examples, an ID document or payment card is fabricated in a platen lamination process, in which component layers of the document are fused together with heat, pressure, or both, without adhesives. Platen lamination allows the formation of flat cards with little or no thermal stress, as compared to roll lamination that creates stresses by stretching and laminating in a nonuniform manner. Platen lamination also reduces or eliminates surface interactions due to electrical charge and surface non-evenness, thereby improving card transportation in the card printer. One or more of the component layers may be preprinted (e.g., with invariable data). The resulting document is referred to herein as a "card blank" or "blank card." The invariable data may be present as microprint or added in an offset printing process on one of the layers used to construct the card blank.

Commercial systems for issuing ID documents and payment cards are of two main types, namely so-called "central" issue (CI), and so-called "on-the-spot" or "over-the-counter" (OTC) issue. CI type documents are not immediately provided to the bearer, but are later issued to the bearer from a central location. For example, in one type of CI environment, a bearer reports to a document station or location where data is collected, the data is forwarded to a central location where the ID document or payment card is produced, and the ID document or payment card is forwarded to the bearer, often by mail. Another illustrative example of a CI assembling process occurs in a setting where a driver passes a driving test, but then receives her license in the mail from a CI facility a short time later. Another illustrative example of a CI assembling process occurs in a setting where a driver renews her license by mail or over the Internet, then receives a driver license card through the mail. Another illustrative example of a CI assembling process occurs in a setting where a consumer applies for a credit card by mail or over the Internet, but then receives her credit card in the mail from a CI facility a short time later.

Centrally issued ID documents and payment cards can be produced from digitally stored information and generally include an opaque core material (also referred to as "substrate"), such as paper or plastic, sandwiched between two layers of clear plastic laminate, such as polyester, to protect the aforementioned items of information from wear, exposure to the elements and tampering. The materials used in such CI ID documents and payment cards can offer durability. In addition, centrally issued ID documents and payment cards generally offer a higher level of security than OTC ID documents and payment cards because they offer the ability to pre-print the core of the CI document with security features such as "micro-printing," ultra-violet security features, security indicia and other features currently unique to centrally issued documents. In some implementations, personalized information, such as an account or card number, an expiration date, and/or card security code, are embossed into the payment card materials to form a raised surface defining the personalized information.

In addition, a CI assembling process can be more of a bulk process facility, in which many ID documents or payment cards are produced in a centralized facility, one after another. The CI facility may, for example, process thousands of ID documents or payment cards in a continuous manner. Because the processing occurs in bulk, CI processes can have an increase in efficiency as compared to some OTC processes, especially those OTC processes that run intermittently. Thus, CI processes can sometimes have a lower cost per document, if a large volume of documents are manufactured.

In contrast to CI documents, OTC documents are issued immediately to a bearer who is present at a document-issuing station. An OTC assembling process provides an ID document or payment card "on-the-spot". An illustrative example of an OTC assembling process is a Department of Motor Vehicles ("DMV") setting where a driver license is issued to person, on the spot, after a successful exam. Another illustrative example of an OTC assembling process is a retailer setting where a prepaid payment card (e.g., a gift card) is issued to person, on the spot, after providing the prepayment. In some instances, the very nature of the OTC assembling process results in small, sometimes compact, printing and card assemblers for printing the ID document or payment card. It will be appreciated that an OTC card issuing process can be by its nature an intermittent process in comparison to a continuous process.

OTC ID documents and payment cards of the types mentioned above can take a number of forms, depending on cost and desired features. Some OTC documents comprise highly plasticized poly(vinyl chloride) or have a composite structure with polyester laminated to 0.5-2.0 mil (about 13-51 µm) poly(vinyl chloride) film, which provides a suitable receiving layer for heat transferable dyes which form a photographic image, together with any variant or invariant data required for the identification of the bearer. These data are subsequently protected to varying degrees by clear, thin overlay patches (0.125-0.250 mil, or about 3-6 µm) applied at the printhead, holographic hot stamp foils (0.125-0.250 mil, or about 3-6 µm), or a clear polyester laminate (0.5-10 mil, or about 13-254 µm) supporting common security features. These last two types of protective foil or laminate sometimes are applied at a laminating station separate from the printhead. The choice of laminate dictates the degree of durability and security imparted to the system in protecting the image and other data.

One response to the counterfeiting of ID documents and payment cards includes the integration of verification features that are difficult to copy by hand or by machine, or which are manufactured using secure and/or difficult to obtain materials. One such verification feature is the application of the signature of the document's issuer or bearer on the document. Other verification features have involved, for example, the use of watermarks, biometric information, microprinting, covert materials or media (e.g., ultraviolet (UV) inks, infrared (IR) inks, fluorescent materials, phosphorescent materials), optically varying images, fine line details, validation patterns or marking, and polarizing stripes. These verification features are integrated into an ID document or payment card in various ways and they may be visible (e.g., surface images) or invisible (covert images) in the finished card. If invisible, they can be detected by viewing the feature under conditions which render it visible (e.g., UV or IR lights, digital watermark readers). At least some of the verification features discussed above have been employed to help prevent and/or discourage counterfeiting.

Signature Panels

FIG. 1A depicts an exemplary ID document 100 with signature panel 102 formed on the front surface 104 of the ID document 100. ID document 100 may be an OTC ID document or a CI ID document. As depicted, the signature panel 102 is formed on the front surface 104 of ID document 100. In some implementations, the signature panel 102 is formed on the back surface of the ID document 100 (not pictured).

As depicted, the signature panel 102 is formed in a particular region 106 of the surface 104 of the ID document 100 that is spatially separated from (e.g., does not overlap) other identifying information on the ID document 100, such as the portrait image 110. However, the signature panel 102 can be formed anywhere on the front surface 104 or back surface (not pictured) of the ID document 100. In some cases, the signature panel 102 may be formed in a region that overlaps one or more items of identifying information printed on the ID document 100.

As depicted in FIG. 1A, the region 106 of the surface 104 of the ID document 100 containing the signature panel 102 covers a minority (e.g., less than half) of the surface area of the surface 104 of the ID document 100, and a second region 108 without a signature panel covers the majority of the surface area of the surface 104 of the ID document 100. In some implementations, the second region 108 of the surface 104 of the ID document 100 is non-porous. As described in further detail herein, the region 106 of the surface 104 containing the signature panel 102 exhibits greater surface energy and greater surface tension than the region 108 of the surface 104 without a signature panel.

Figure 1B:
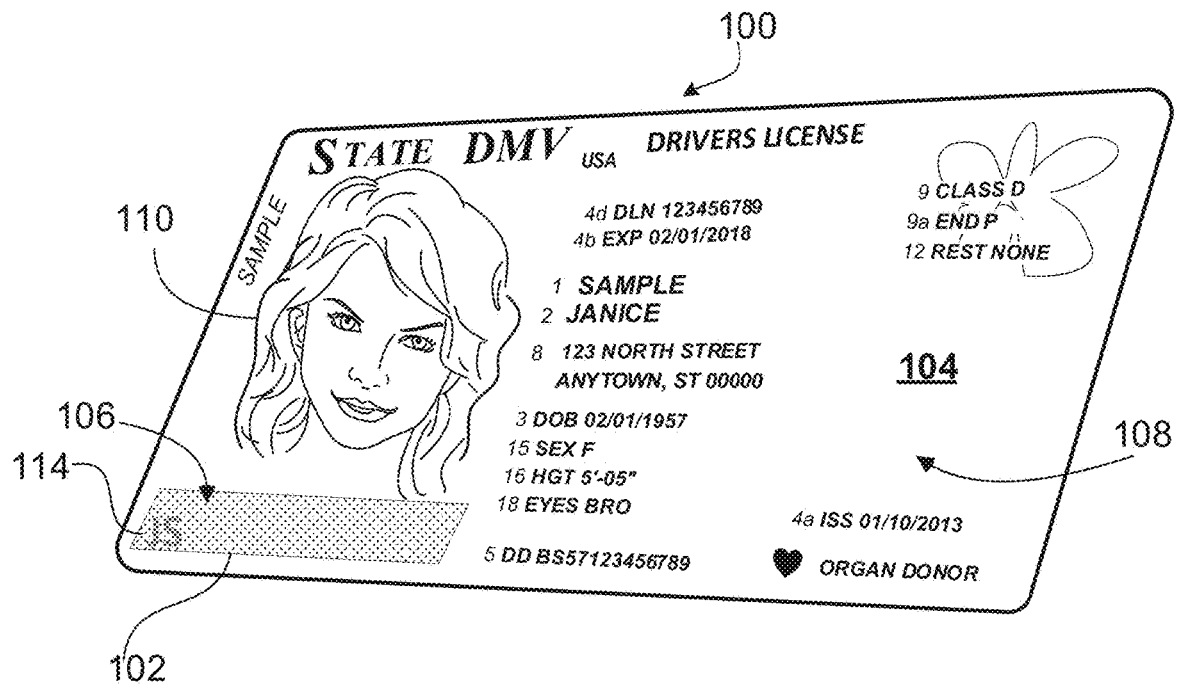
Figure 1C:
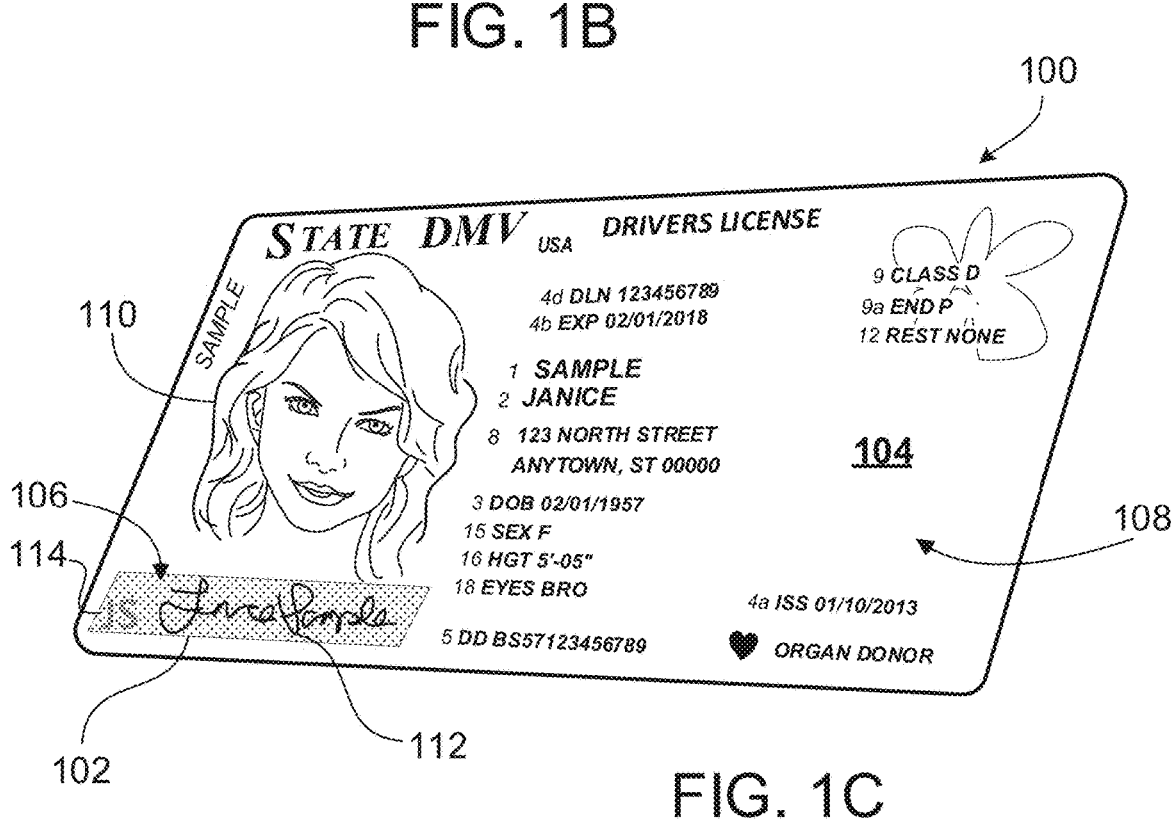
Figure 1D:
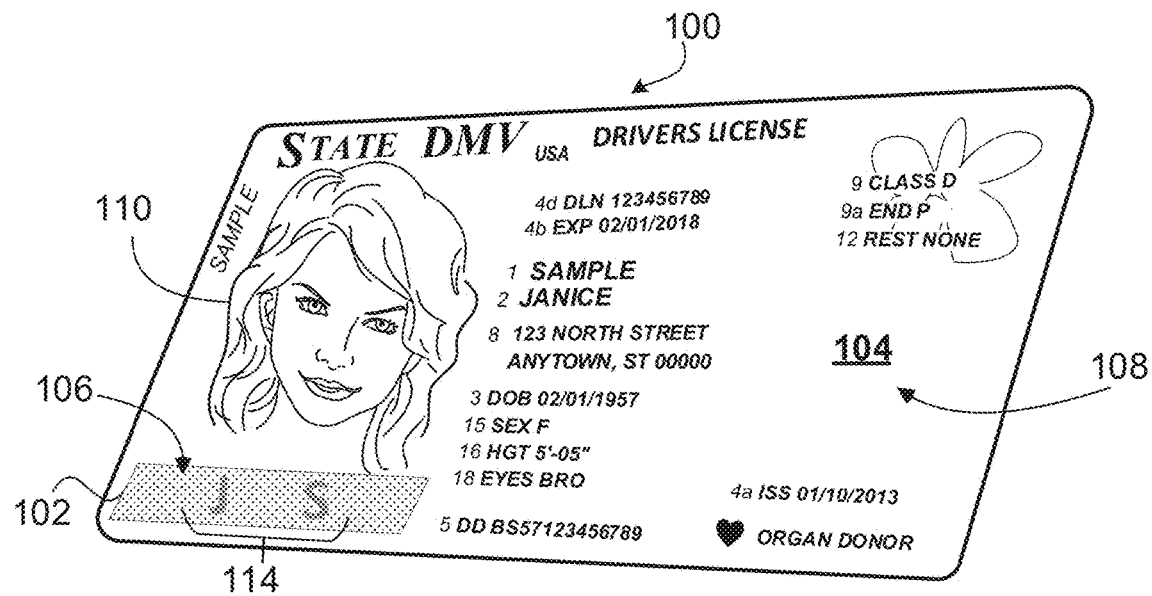
Figure 1E:
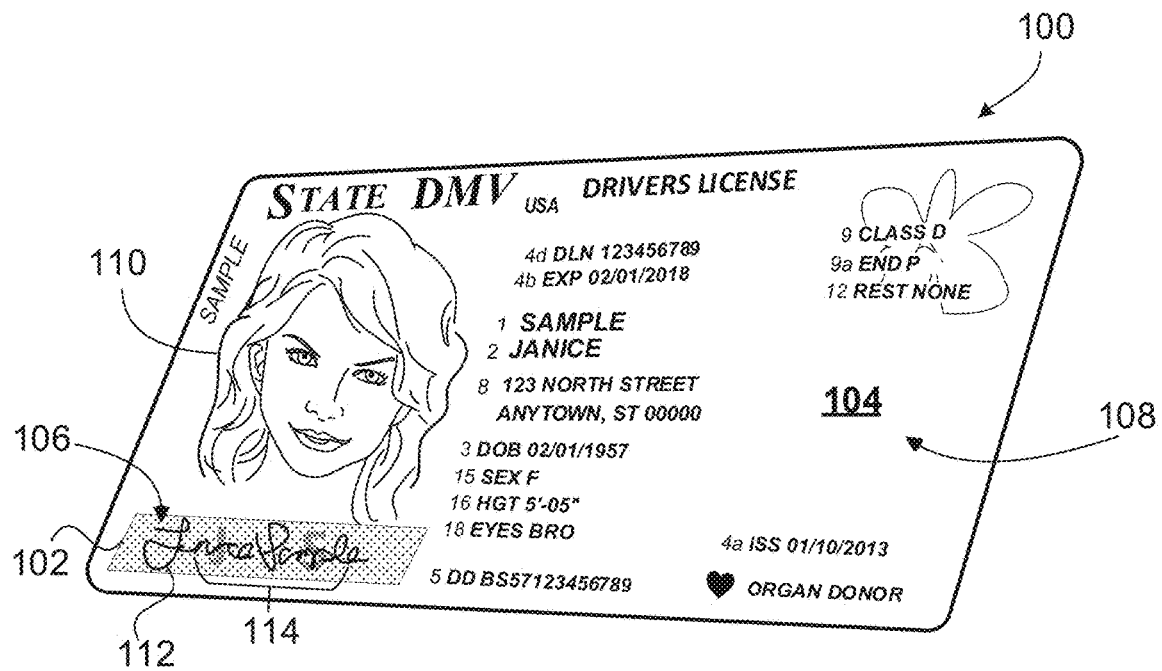

As depicted in FIGS. 1C and 1E, a signature 112 can be applied to the signature panel 102. For example, the signature 112 of the bearer of the ID document 100, or any other ink markings, can be applied to the signature panel 102 of the ID document 100 as a feature for verifying the identity of the bearer. As described in further detail herein, the structure of the signature panel 102 is configured to retain ink markings (i.e., signatures 112) applied to the signature panel 102. Various types of ink may be used to apply a signature 112 to the signature panel 102 including, but not limited to, oil-based inks, such as ballpoint pen ink, and water-based inks, such as fountain pen ink.

FIGS. 1B-1E depict an ID document 100 with signature panel 102 that includes an item of personalized data 114 formed within the signature panel 102. As depicted in FIGS. 1B-1E, the personalized data 114 formed within the signature panel 102 can be the initials of the bearer of the ID document 100. However, the personalized data 114 can include other identifying information or personal credentials, including text, graphical patterns, images, and the like. In some implementations, the personalized data 114 is formed in the outer surface of ID document 100 in the region 106 of the surface 104 containing the signature panel 102. As depicted in FIGS. 1B and 1C, in some implementations, the personalized data 114 is formed in a corner of the signature panel 102, or otherwise contained to a particular region of the signature panel 102. In some examples, as depicted in FIGS. 1D and 1E, the personalized data 114 is distributed across the signature panel 102 such that a signature 112 of the bearer may be applied over the personalized data 114. As depicted in FIGS. 1C and 1E, the signature panel 102 is configured such that both the personalized data 114 and the signature 112 of the bearer are visible when the signature 112 is applied to the panel 102. As described in further detail herein, in some implementations, the placement of the personalized data 114 within the signature panel 102 is defined by a pattern in a digital image used for generating the signature panel 102.

Figure 1F:
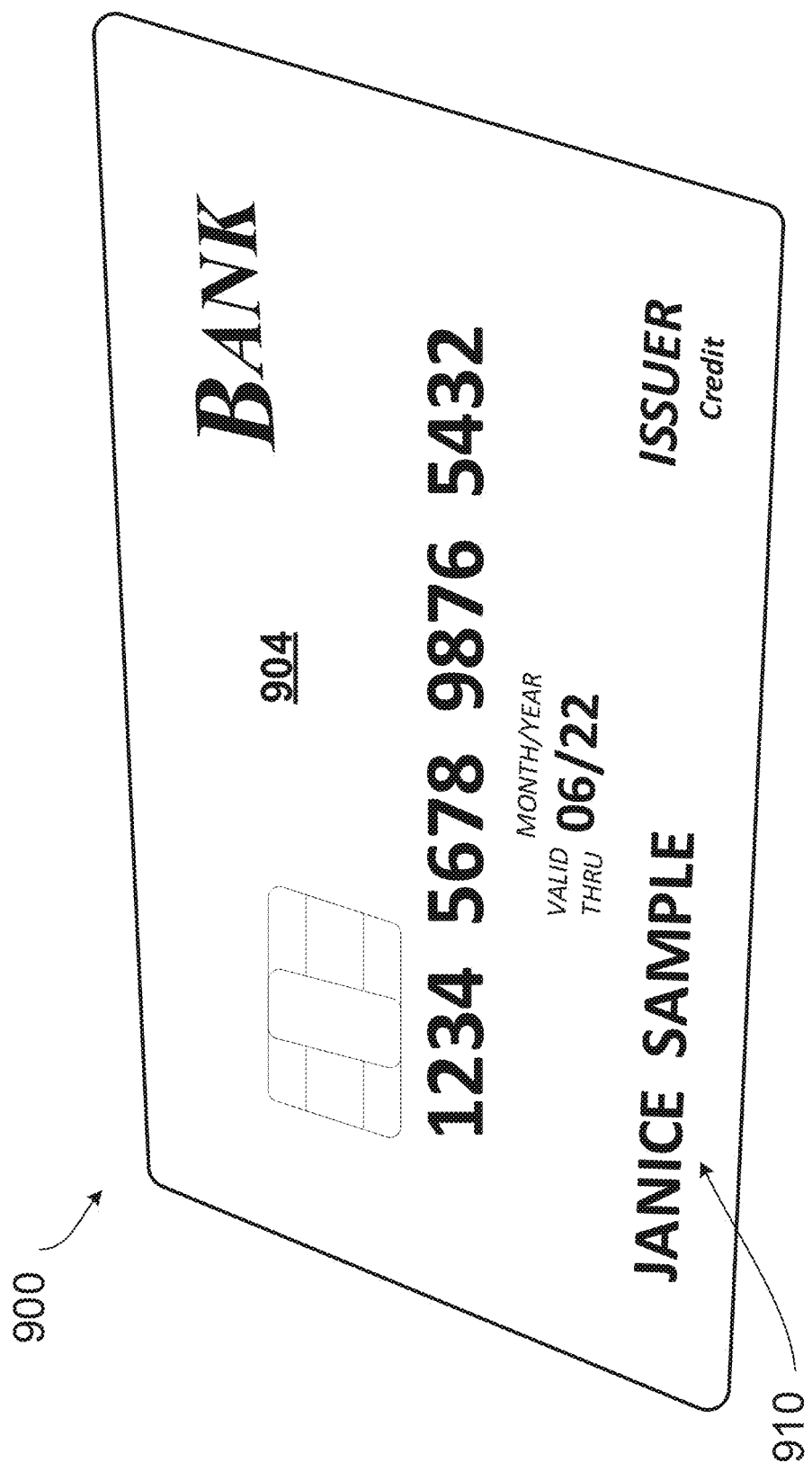
FIGS. 1F-1K depict an example payment card with a signature panel formed in a surface of the payment card.
Figure 1G:
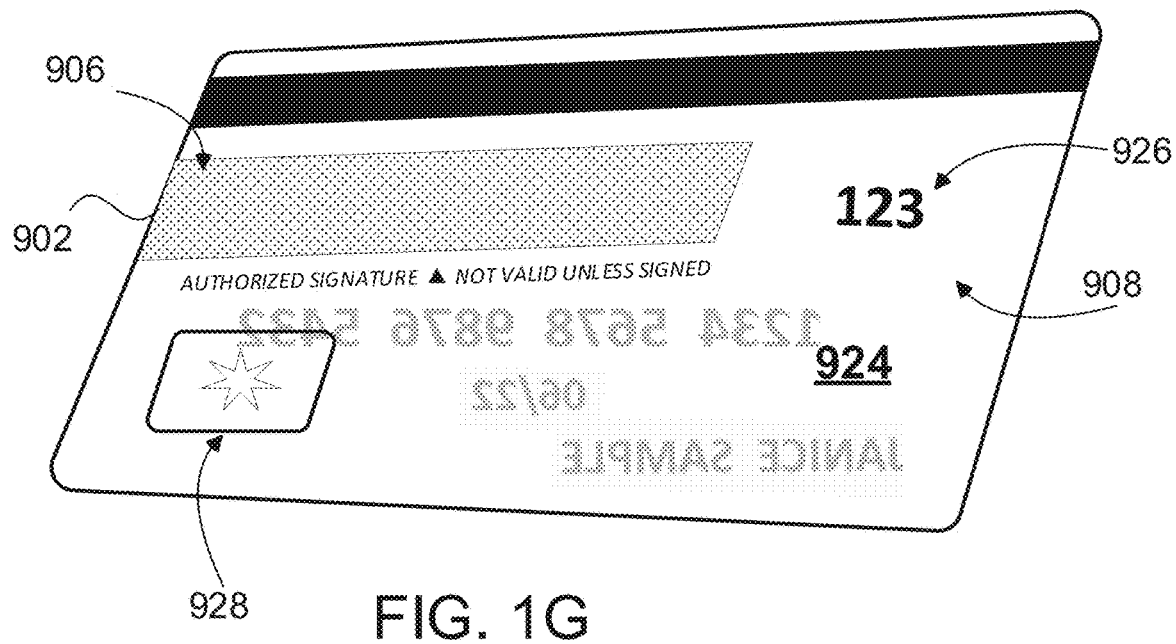

FIG. 1F depicts an exemplary payment card 900 viewed from the front surface 904 of the payment card 900. Payment card 900 may be an OTC payment card or a CI payment card. As depicted, the payment card 900 includes the name 910 of the bearer of the payment card 900 on the front surface 904 of the payment card 900.

FIGS. 1G-1K depict the payment card 900 as viewed from the back surface 924 of the payment card 900. As depicted in FIGS. 1G-1K, a signature panel 902 is formed in the back surface 924 of the payment card 900. In some implementations, the signature panel 902 is formed on the front surface 904 of the payment card 900.

As depicted, the signature panel 902 is formed in a particular region 906 of the back surface 924 of the payment card 900 that is spatially separated from (e.g., does not overlap) other information on the payment card 900, such as the security code 926 or security image 928. However, the signature panel 902 can be formed anywhere on the front surface 904 or back surface 924 of the payment card 900. In some cases, the signature panel 902 may be formed in a region that overlaps one or more items of information printed on the payment card 900.

As depicted in FIGS. 1G-1K, the region 906 of the back surface 924 of the payment card 900 containing the signature panel 902 covers a minority (e.g., less than half) of the surface area of the back surface 924 of the payment card 900, and a second region 908 without a signature panel covers the majority of the surface area of the back surface 924 of the payment card 900. In some implementations, the second region 908 of the back surface 924 of the payment card 900 is non-porous. As described in further detail herein, the region 906 of the back surface 924 containing the signature panel 902 exhibits greater surface energy and greater surface tension than the region 908 of the back surface 924 without a signature panel.

Figure 1H:
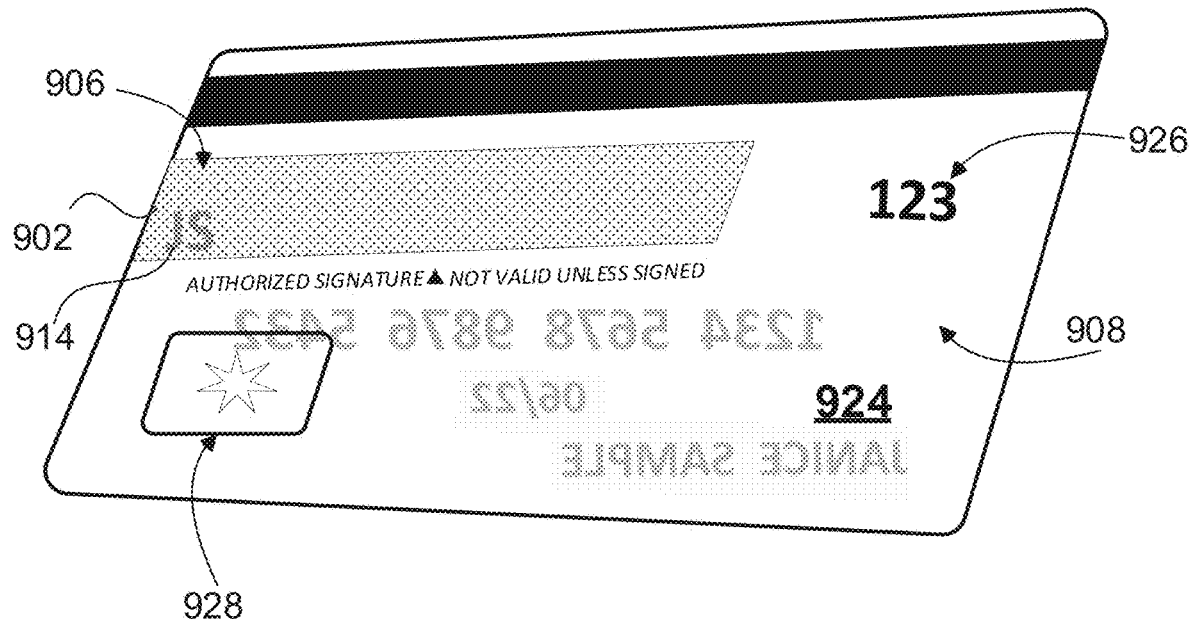
Figure 1I:
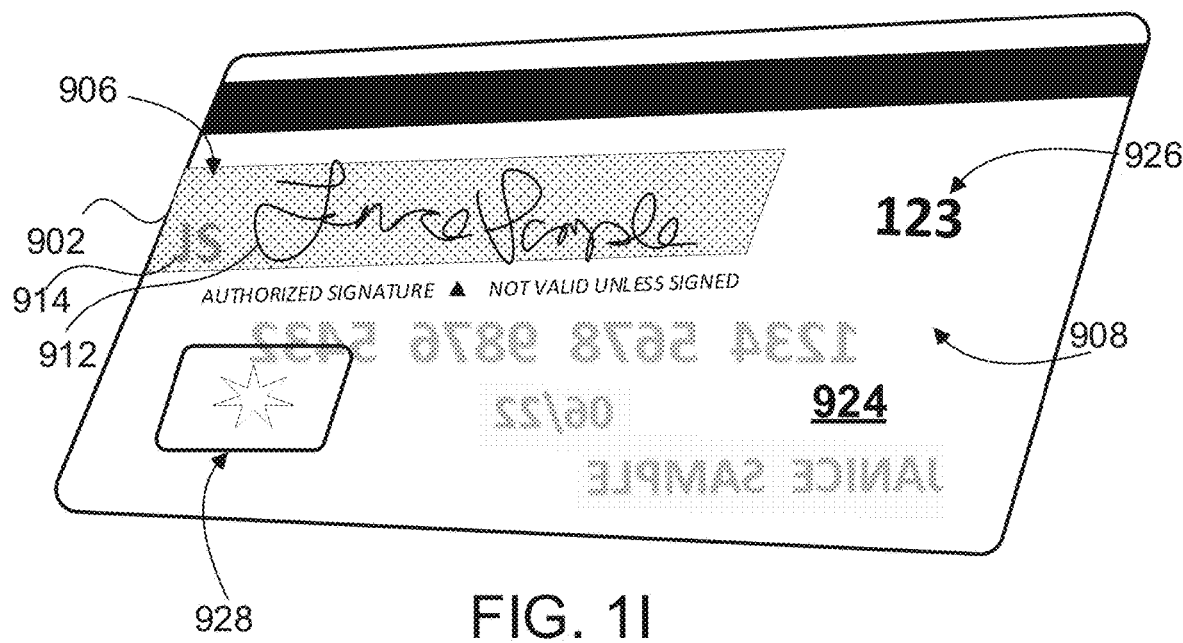
Figure 1J:
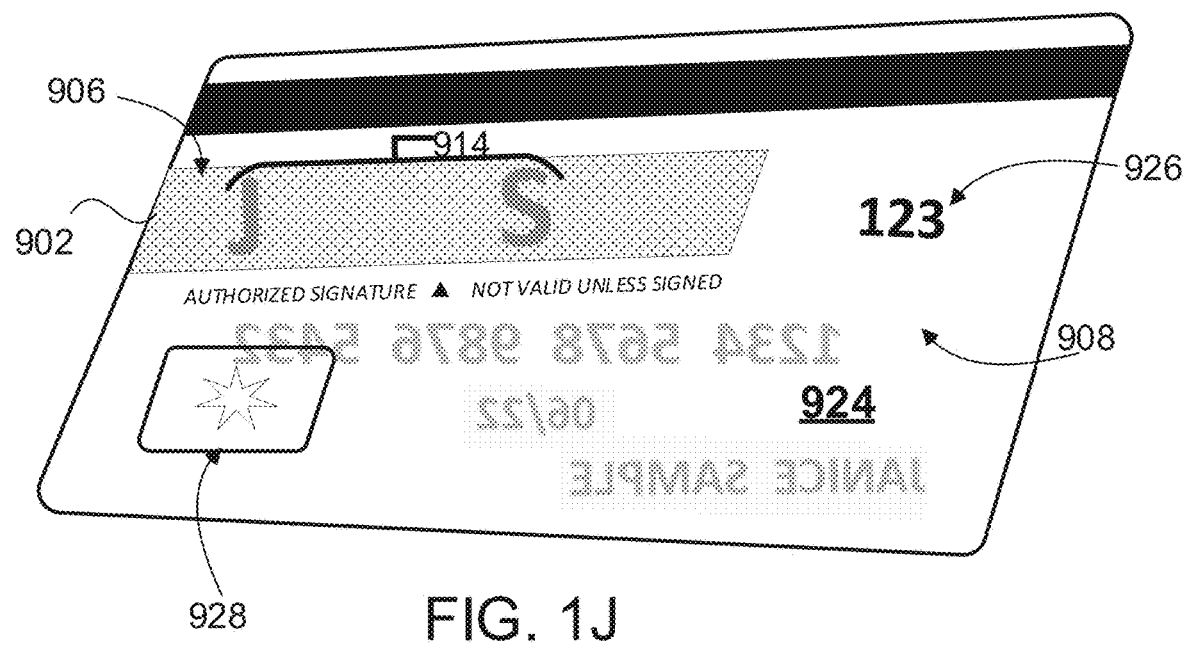
Figure 1K:
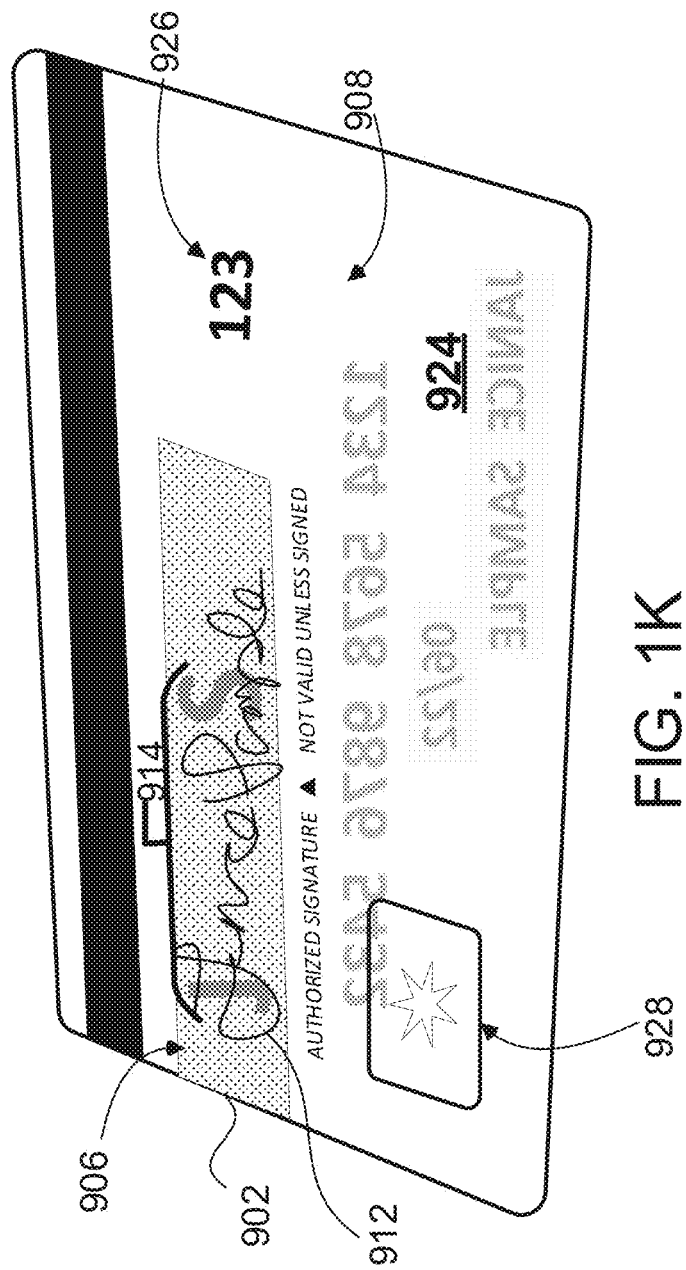

As depicted in FIGS. 1I and 1K, a signature 912 can be applied to the signature panel 902. For example, the signature 912 of the bearer of the payment card 900, or any other ink markings, can be applied to the signature panel 902 of the payment card 900 as a feature for verifying the identity of the bearer. As described in further detail herein, the structure of the signature panel 902 is configured to retain ink markings (i.e., signatures 912) applied to the signature panel 902. Various types of ink may be used to apply a signature 912 to the signature panel 902 including, but not limited to, oil-based inks, such as ballpoint pen ink, and water-based inks, such as fountain pen ink.

FIGS. 1H-1K depict a payment card 900 with signature panel 902 that includes an item of personalized data 914 formed within the signature panel 902. As depicted in FIGS. 1H-1K, the personalized data 914 formed within the signature panel 902 can be the initials of the bearer of the payment card 900. However, the personalized data 914 can include other identifying information or personal credentials, including text, graphical patterns, images, and the like. In some implementations, the personalized data 914 is formed in the outer surface of payment card 900 in the region 906 of the back surface 924 containing the signature panel 902. As depicted in FIGS. 1H and 1I, in some implementations, the personalized data 914 is formed in a corner of the signature panel 902, or otherwise contained to a particular region of the signature panel 902. In some examples, as depicted in FIGS. 1J and 1K, the personalized data 914 is distributed across the signature panel 902 such that a signature 912 of the bearer may be applied over the personalized data 914. As depicted in FIGS. 1I and 1K, the signature panel 902 is configured such that both the personalized data 914 and the signature 912 of the bearer are visible when the signature 912 is applied to the panel 902. As described in further detail herein, in some implementations, the placement of the personalized data 914 within the signature panel 902 is defined by a pattern in a digital image used for generating the signature panel 902.

Methods of forming a signature panel on an ID document, such as signature panel 102 of ID document 100, can include altering the surface (e.g., surface 104) of the ID document to increase the energy of the surface. For example, a signature panel may be formed by altering a first region of the surface to increase the energy between molecules of the surface in the first region compared to the energy between surface molecules in a second region of the surface. In some implementations, a $CO_2$ laser may be used to irradiate the surface of the ID document to form a signature panel. In some implementations, a YAG laser may be used to irradiate the surface of the payment card to form a signature panel. As described in further detail herein, irradiation of the surface of an ID document alters the surface topology of the irradiated region of the surface and changes the chemical nature of the irradiated region of the surface, which can improve the application and retention of ink markings (e.g., signatures) applied to the surface of the ID document.

Irradiation of a polymer layer on the surface of an ID document can result in oxidation of the irradiated region of the surface. For example, by increasing the energy of a region of the surface of the ID document via laser irradiation, the molecules on the surface of the ID document in the region of the surface subjected to radiation are excited, resulting in oxidation and removal of material from the surface of the ID document in the irradiated region. In some implementations, the removal of surface material via irradiation forms a series of depressions in the irradiated region of the surface of the ID document. As a result, ink applied to the irradiated surface of the ID document settles into the depressions formed by the irradiation, which can improve the retention of ink markings applied to the surface of the ID document. In addition, creating depressions in the surface of the ID document via irradiation increases the active surface area of the irradiated region of the surface.

In some implementations, the depressions formed by irradiation have a depth measured from the non-irradiated surface of the card to the bottom of the depression ($R_a$) ranging from about 8 micrometers to about 22 micrometers below the non-irradiated surface of the card. In addition, laser irradiation of the surface of the ID document can result in the formation of raised peaks adjacent to the depressions on the irradiated surface as material from the surface of the ID document is melted via irradiation. In some implementations, the depth of the depressions formed by irradiation measured from the top of a peak to the bottom of an adjacent depression ($R_z$) ranges from about 50 micrometers to about 150 micrometers. As described in further detail herein, in some implementations, a pattern may be used as a guide during irradiation to produce a pattern of depressions in the surface of the ID document optimized for retention of ink markings.

Irradiation of the surface of the ID document can also alter the chemical nature of the surface of the ID document. For example, when a region of the surface of the ID document is subjected to laser irradiation in the presence of oxygen, the irradiated region of the surface reacts with the oxygen, resulting in an increased surface energy and an increased surface tension in the irradiated region. In one example, a first, irradiated region of the surface of an ID document has a surface tension of about 44 Dyne, and a second, non-irradiated region of the surface of the ID document has a surface tension of about 36 Dyne. In some implementations, the amount of change in the surface energy and the surface tension of the ID document resulting from irradiation is dependent on the type of material used to form the surface of the ID document. In addition, the amount of change in the surface energy and the surface tension of the ID document can be influenced by the laser settings used for the irradiation, such as the power of the laser. These chemical changes to the surface caused by application of thermal energy to the surface via irradiation result in an increased chemical attraction and bonding between the surface and ink applied to the surface in the irradiated region.

In some implementations, the surface of an ID document is irradiated with a laser using a digital grayscale image as a guide. In some implementations, a digital grayscale image defines a pixel pattern that, when applied to the surface of an ID document using irradiation, results in a pattern of depressions in the surface of the document that are configured to capture and retain ink markings applied to the irradiated surface. FIGS. 2-5 depict example digital grayscale images 200, 300, 400, 500 that can be used to generate a signature panel on an ID document via laser irradiation. As depicted in FIGS. 2-5, the digital grayscale image 200, 300, 400, 500 can include a pixel pattern that is used as a guide for irradiation of the ID document surface.

In some implementations, the pixel pattern of the digital grayscale image is a continuous pixel pattern. Generation of a digital grayscale image with a continuous pixel pattern can be performed using an image dithering algorithm that results in more continuous pixel patterns. FIGS. 2-5 depict digital grayscale images with continuous pixel patterns generated using dithering techniques. In one example, the Jarvis-Judice-Ninke image dithering algorithm diffuses the error to twelve neighboring pixels, which results in high fidelity dithering with continuous pixel patterns. Other dithering techniques include, for example, Floyd-Steinberg dithering, Atkinson dithering, Sierra dithering, Sierra Lite dithering, Halftone, and the like. Any suitable form of pixel pattern can be used to form the signature panel on the ID document.

Figure 2:
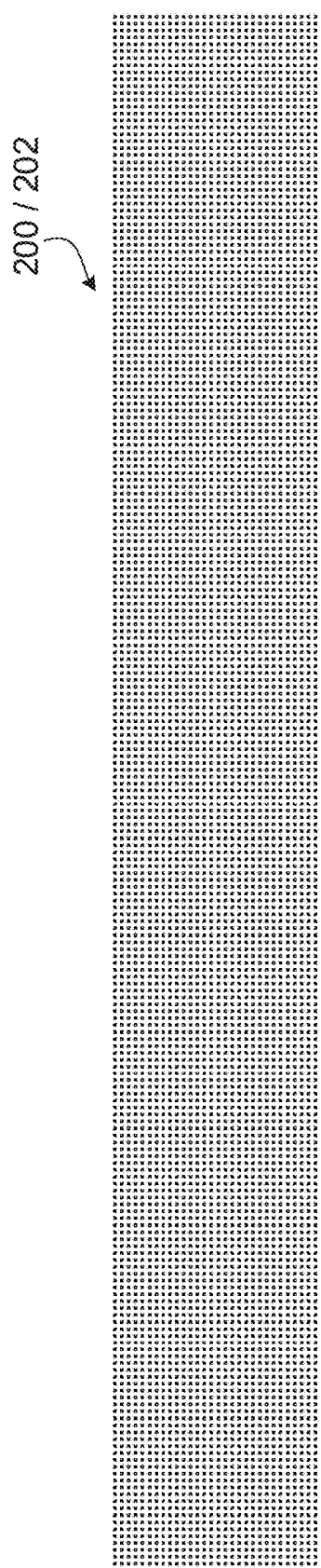
FIGS. 2-5 depict example graphical images used for creating signature panels in ID documents or payment cards.

In some implementations, a laser (e.g., a $CO_2$ laser) is applied to all regions of the digital grayscale image labeled as "dark." For example, in order to generate the pattern defined by the digital grayscale image 200 in FIG. 2, a laser is applied to a region of the surface of an ID document corresponding to the dark areas (i.e., gray areas) of the digital grayscale image 200.

Figure 3:
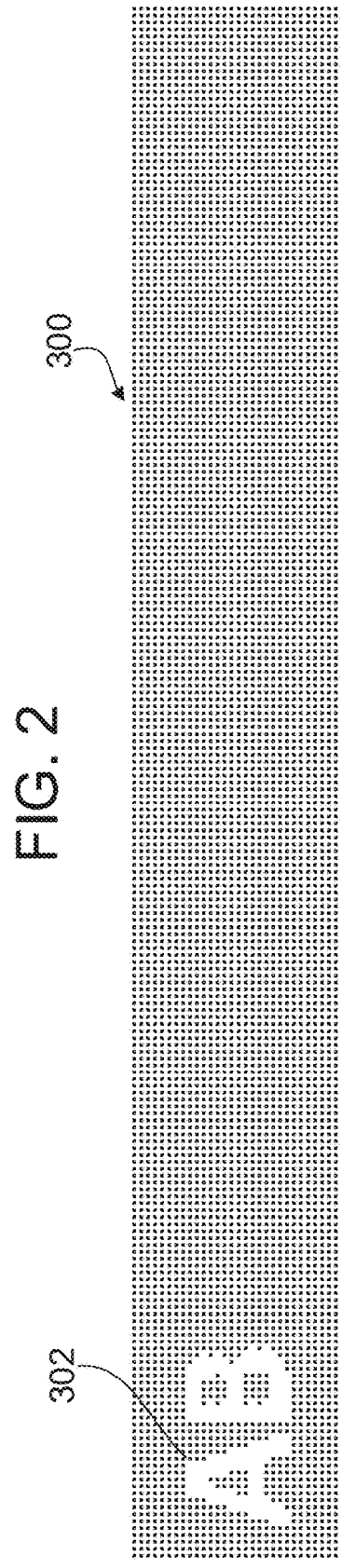
Figure 4:
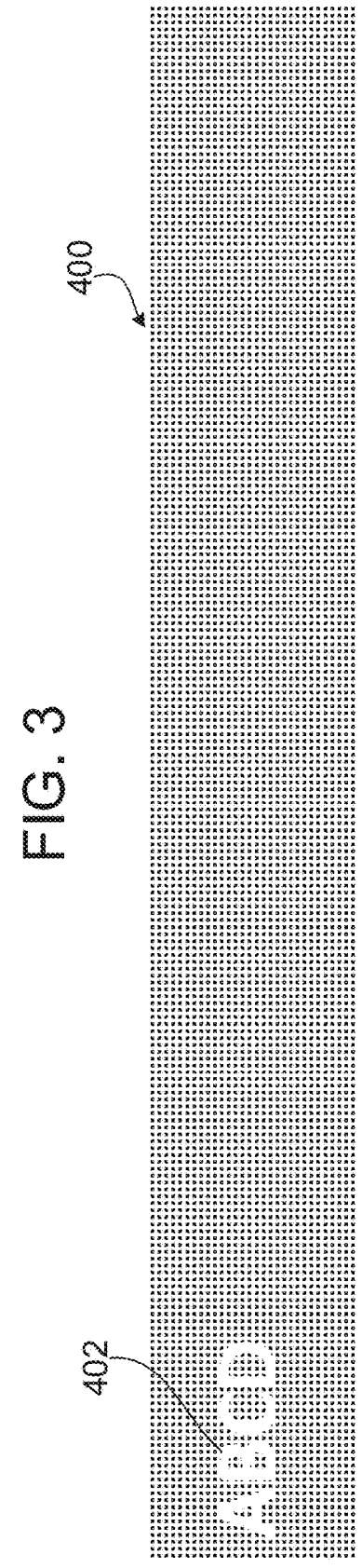

In some examples, a pattern of depressions is formed in the surface of an ID document via laser ablation in order to provide improved retention of ink markings applied to the surface of the ID document. As depicted in FIGS. 2-5, the digital grayscale image 200, 300, 400, 500 that is used as a guide for forming a patterned signature panel can include a pixel pattern with two or more colors or shades of pixels. For example, as shown in FIG. 2, the digital grayscale image 200 may define a grid-like or dotted pattern 202 using alternating pixel shades, such as gray and white pixels. The pattern 202 in the digital grayscale image 200 is used to form a signature panel with a corresponding pattern of depressions formed within the surface of the ID document via laser ablation. Any suitable pattern for retaining ink may be formed within the surface of the ID document via laser ablation to generate the signature panel In some examples, laser radiation is applied to the surface regions corresponding to pixels in the digital grayscale image identified as "dark" (e.g., gray) and radiation is not applied surface regions corresponding to pixels in the digital grayscale image identified as "light" (e.g., white). As previously discussed, irradiation of the surface of an ID document results in the removal of material from the surface of the ID document. In some implementations, regions of the surface of an ID document corresponding to dark pixels in a digital grayscale image are subjected to radiation and material is removed from those regions, resulting in a pattern of depressions formed in the surface of the ID document corresponding to the pattern of dark pixels in the digital grayscale image. By only irradiating portions of the surface of the ID document corresponding to the "dark" pixels in the digital grayscale image, a "knockout" (i.e., an unablated area of the surface) can be generated. As depicted in FIGS. 3 and 4, the difference in pixel color can be used to form a knockout defining personalized data 302, 402 within the irradiated signature panel (e.g., signature panel 102). Knockouts formed using the techniques described above appear raised in relation to the portions of the document surface surrounding the knockout that have been subjected to laser irradiation.

Figure 5:

In some implementations, the digital grayscale image includes two or more shades of "dark" (i.e., non-white) pixels, and the level of energy applied to each area corresponds to the color of the corresponding pixel. For example, as depicted in FIG. 5, the digital grayscale image includes gray pixels 502 and black pixels 504. As depicted, black pixels 504 define personalized data 506 related to the bearer of the ID document. In order to generate a signature panel based on digital grayscale image 500, a first level of laser energy is applied to a first region of the surface of the ID document corresponding to the gray pixels 502 and a second level of laser energy is applied to a second region of the surface of the ID document corresponding to the black pixels 504. In addition, no laser radiation is applied to portions of the second region corresponding to white pixels. The difference in laser energy level applied to the first and second regions of the surface of the ID document results in a difference in the amount of material removed from each of the first region and the second region of the ID document surface. For example, a lower level of laser energy can be applied to a first region of the surface of the ID document corresponding to the gray pixels 502 and a higher level of laser energy can be applied to a second region of the surface of the ID document corresponding to the black pixels 504. As a result, a greater amount of material is removed from the second region of the ID document surface corresponding with the black pixels 504 of the digital grayscale image 500 than the first region of the ID document surface corresponding with the gray pixels 502 of the digital grayscale image 500. The difference in the amount of material removed from each region of the ID document surface creates a pattern in the surface that includes the personalized data 506 of the bearer. As previously discussed, forming personalized data of the bearer into the surface of the ID document via irradiation increases the security of the document and prevents counterfeiting of the ID document.

While the methods of generating a signature panel have been described above in reference to forming a signature panel in an ID document, similar methods can be used to form signature panels in payment cards (such as signature panel 902 on payment card 900).

Figure 6:
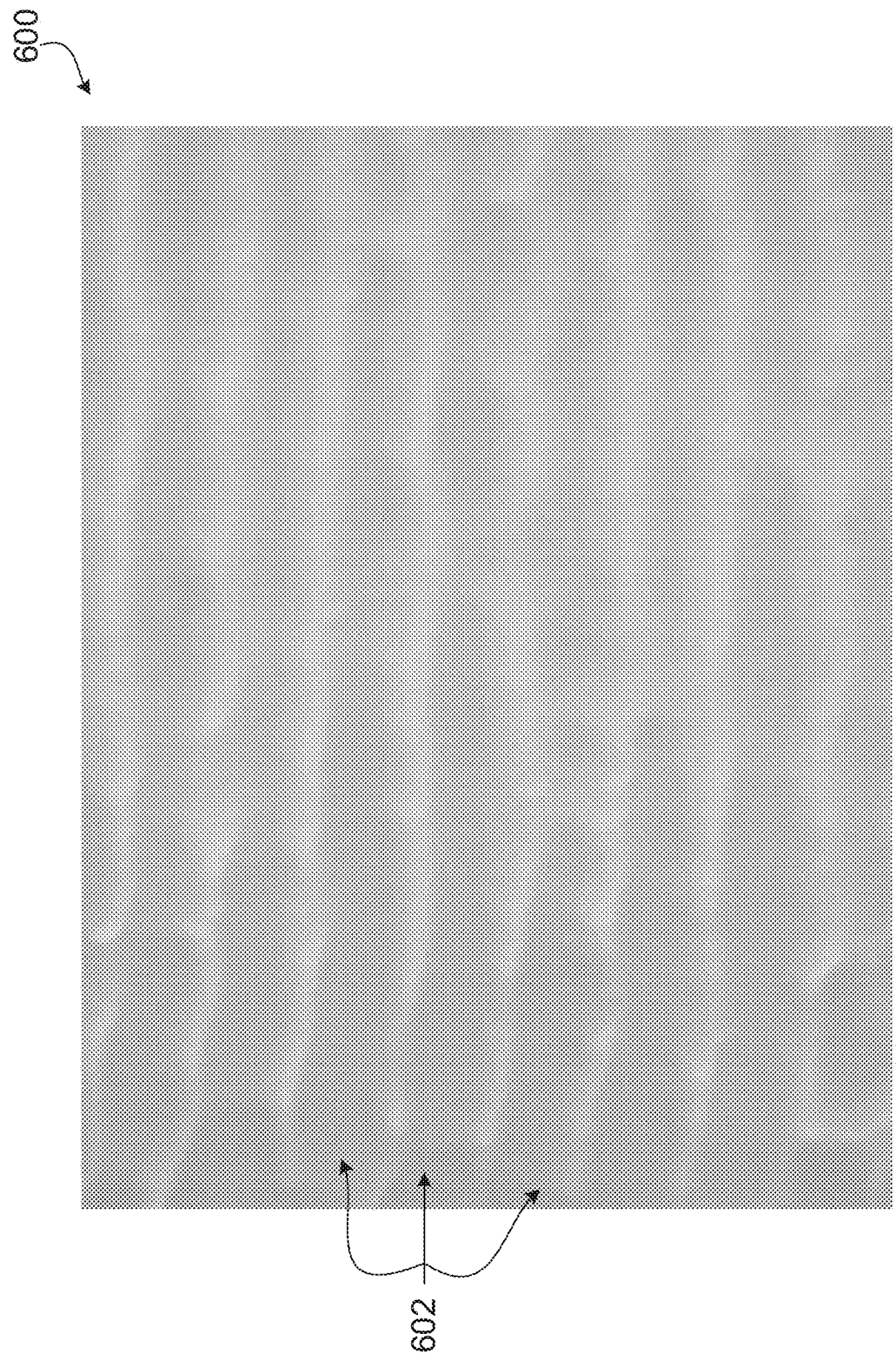
FIG. 6 depicts an enlarged view of a surface of card with a laser irradiated signature panel.

FIG. 6 depicts an enlarged view of a portion of a surface 600 that has been subjected to laser radiation to form a signature panel. As can been seen in FIG. 6, a pattern of depressions 602 have been formed in the surface 600 of a card (e.g., an ID document or a payment card). As previously described, the pattern of depressions 602 can be formed based on a digital grayscale image (such as digital grayscale image 200 of FIG. 2), and can be configured to attract and retain ink markings applied to the surface 600 of the card in the region that includes the depressions 602. For example, when a signature is applied to the surface 600 of the card in the region having a pattern of depressions 602 (i.e., the signature panel), the ink is captured and retained within the depressions 602. Further, as previously discussed, irradiation of the card surface 600 alters the chemical properties (e.g., surface energy, surface tension, etc.) of the irradiated portion of the surface 600 to increase the attraction and bond between the ink and the irradiated surface 600.

The energy level and speed of the laser may be adjusted according to the card material and the desired depth of the depressions of the signature panel to be formed in the card surface 600. Generally, laser parameters are selected such that at least some of the material of the surface 600 of the card is ablated, and some of the energy is absorbed by the outer layer of the card as thermal energy, such that polymeric material in the outer layer is melted and flows from one pixel in the digital grayscale image to one or more adjacent or directly adjacent (abutting) pixels to form peaks and depressions on the surface of the card. The combination of ablation and heat absorption creates a surface that is correlated to the pattern of the digital grayscale image in topographical content. When the affected area is slightly larger than the physical pixel size, the neighboring pixels are melted into each other when the laser beam is applied. As such, no pixilation in the signature panel is visible to the unaided human eye.

In one example, a digital grayscale image is generated and a $CO_2$ laser is used with the settings listed in Table 1 below under atmospheric conditions to form a signature panel in an outer surface layer of an card.

TABLE 1

| Laser settings for signature panel. | |
| --- | --- |
| Pumping power: | 15.00% |
| Frequency: | 25,000 Hz |
| Speed: | 2000 mil/s |
| Pulse width: | 10.0 μm |
| Line width: | 0.200 mil |

In another example, a digital grayscale image is generated and a $CO_2$ laser is used with the settings listed in Table 2 below under atmospheric conditions to form a signature panel in an outer surface layer of an card.

TABLE 2

| Laser settings for signature panel. | |
| --- | --- |
| Pumping power: | 10.00% |
| Frequency: | 15,000 Hz |
| Speed: | 2000 mil/s |
| Pulse width: | 10.0 μm |
| Line width: | 0.200 mil |

Various laser irradiation techniques may be used to form the signature panel in the card. For example, the laser may be configured to continuously emit radiation throughout the irradiation process and the card may be moved relative to the laser beam in order to form a patterned signature panel on the surface of the card. In some implementations, the card is stationary and the laser is used in a pulsating mode to provide pulses of radiation and the laser is moved across portions of the surface of the card to form a patterned signature panel.

Figure 7:
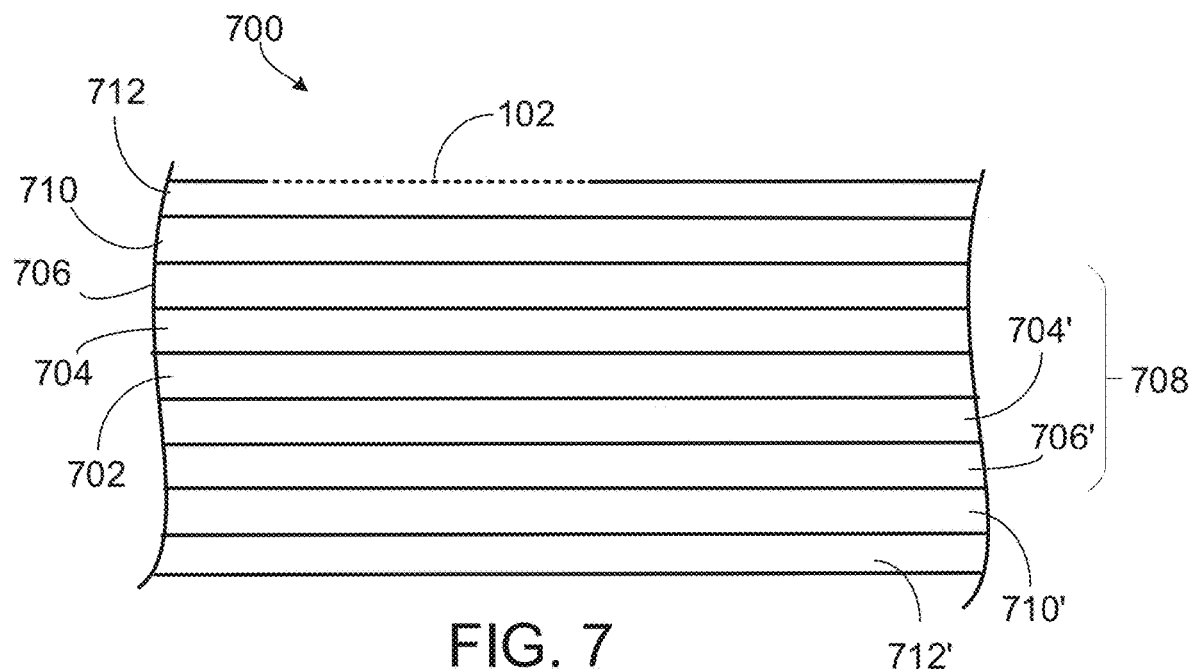
FIG. 7 depicts a cross-sectional view of an over-the-counter card with a signature panel.

A signature panel may be formed in ID documents or payment cards having a variety of configurations, including in an OTC document, such as exemplary OTC card 700 depicted in FIG. 7. FIG. 7 is a cross-sectional view of card 700 (e.g., an OTC ID document or an OTC payment card) taken through signature panel 102 formed in the outer surface of the card 700. Card 700 includes core layer 702, tie layers 704, 704' on either side of the core layer, and structural layers 706, 706' on the outer side of tie layers 704, 704', respectively. Core layer 702 is opaque, and may be preprinted on one or both sides (e.g., with invariable data). One or more of tie layers 704, 704' may also be preprinted, engraved, or both. Tie layers 704, 704' typically include multiple co-extruded layers and promote bonding between core layer 702 and structural layers 706, 706'. Structural layers 706, 706' provide durability as well as stiffness and flatness. Tamper-evident (TE) patterns may be coated onto structural layers 706, 706' via gravure. After assembly (e.g., manually or via machine), core layer 702, tie layers 704, 704', and structural layers 706, 706' are laminated in a platen lamination process to yield card blank 708, formed in the absence of adhesive compositions. The platen lamination process facilitates debossing, as well as the flatness, superior surface finish, and desired polish for card blank 708.

Receiver layers 710, 710' may be coated on the outer side of each structural layer 706, 706', respectively, and may be bonded to the structural layers via solvent dissolution, thereby becoming part of the structural layers. Tamper-evident patterns may be coated on an underside of one or more of receiver layers 710, 710'. Receiver layers 710, 710' allow good image replication (e.g., via D2T2) as well as debossing. Patterns formed by plate debossing go through the D2T2 receiver layer and into the structural layer underneath, thereby providing protection of the image, photo, or text (as applicable) from tampering or counterfeiting.

Overlaminate layers 712, 712' may be coated on receiver layers 710, 710', respectively, after personalization. For example, overlaminate layer 712 represents front surface 104 of ID document 100, and overlaminate layer 712' represents the back surface of the ID document 100.

Receiver layers 710, 710' and overlaminate layers 712, 712' are not considered to be part of the card blank. Thus, card blank 708 has five layers, including core layer 702, tie layers 704, 704', and structural layers 706, 706'. Signature panel 102 defines one or more depressions in overlaminate layer 712.

Core layer 702 is typically opaque. Suitable materials for core layer 702 include white poly(vinyl chloride) (PVC), polyester, polycarbonate, polystyrene, and the like. TESLIN and other polymers that are capable of z-axis tear out and are immiscible with other polymers are typically not suitable for core layer 702. A thickness of core layer 702 is typically in a range of 5 to 10 mil (about 125 to 250 µm). Fixed indicia may be printed (or pre-printed) on core layer 702. The core layer in at least some embodiments is formed using a material adapted to be printable or markable (e.g., by laser marking) using a desired printing/marking technology. Materials that are printable can include, as an example, materials such as polyolefin, polyester, polycarbonate (PC), PVC, plastic, polyethylene terephthalate (PET), polyethylene terephthalate glycol-modified (PETG), polyethylene terephtalate film (PETF), and combinations thereof. However, materials that can split in the z-axis are typically not suitable. Many other materials are, of course, suitable, as those skilled in the art will appreciate. In an advantageous embodiment, core layer 702 is substantially opaque, which can enable printing on one side to be not viewable from the other side, but opacity is not required. In some embodiments, it may, in fact, be advantageous that core layer 702 be substantially transparent. The color of the core layer 702 may vary, but in an advantageous embodiment the core layer is colored to provide a good contrast with indicia printed (or otherwise formed) thereon. In one example, core layer 702 is light in color, thereby allowing good contrast with dark indicia. In another example, core layer 702 is dark in color, thereby allowing good contrast with light indicia.

Tie layers 704, 704' typically include multiple layers of chemically modified resins with reactive moieties (e.g., isocyanates) attached to the base resin. The reactive moieties in an outer layer of a tie layer are selected to form covalent bonds with the layer in contact with the tie layer during lamination. Suitable materials for tie layers 704, 704' are compatible with other materials in the card 700 and include PETG and PC. A thickness of tie layers 704, 704' is typically in a range of 2 to 6 mil (about 50 to 150 µm). Thickness, composition, or both of tie layers 704 and 704' may be the same or different. In some cases, a laser engraved image (e.g., a hologram or KINEGRAM) is formed in one or more of tie layers 704, 704' (e.g., in tie layer 704).

Suitable materials for structural layers 706, 706' include PC, polyethers, polyphenoxides, polyphenols, polyesters, polyurethanes, and the like. Structural layers 706, 706' may be sensitized to accept laser engraving. A thickness of structural layers 706, 706' is typically in a range of 2 mil to 10 mil (about 50 µm to about 250 µm). Thickness, composition, or both of structural layers 706, 706' may be the same or different.

Suitable materials for receiver layers 710, 710' include PC (e.g., non-sensitized), coated with, for example, modified PVC with antioxidants. The receiver coating allows good image replication and using deboss patterns promotes protection of printed features (e.g., images, text) from tampering, counterfeiting, or both. A thickness of receiver layers 710, 710' is typically in a range of 4 to 10 mil (about 100 to about 250 µm). Thickness, composition, or both of receiver layers 710, 710' may be the same or different.

Suitable materials for overlaminates 712, 712' include polyester, polycarbonate (PC), polystyrene, cellulose ester, polyolefin, polysulfone, polyamide, polyvinyl chloride (PVC), and acrylonitrile butadiene styrene. Laminates can be made using either an amorphous polymer (e.g., amorphous polyester) or biaxially oriented polymer (e.g., oriented polyester). Signature panel 102 is formed in the overlaminate 712 as described herein, yielding a clear topographical feature having no pixilation visible to the unaided human eye.

If two directly adjacent layers are made of substantially the same material (e.g., polycarbonate), they may be laminated together into a single structure, as understood by those skilled in the art. Similarly, if a laminate and an overlaminate are both made of the same material (e.g., polycarbonate), they can be laminated into a single structure.

In one example, card blank 708 includes layers 702, 704, 704', and 706, 706', as defined below.

Structural layer 706: 7 mil polycarbonate (PC) (non-sensitized);
Tie layer 704: 5 mil five-layer co-extruded tie layer (e.g., PETG/PETG+PC/PC/PETG+PC/PETG);
Core layer 702: 6 mil white polyvinyl chloride (PVC);
Tie layer 704': 5 mil five-layer coextruded tie layer (e.g., PETG/PETG+PC/PC/PETG+PC/PETG); and
Structural layer 706': 7 mil PC (non-sensitized).
Receiver layers 710, 710' (e.g., 2-6 mil D2T2 receiver layers) may be coated on structural layers 706, 706', respectively, prior to personalization. The card blank may be personalized in a CI or OTC setting and the printed card may be overlaminated. In one example, overlaminate layers 712, 712' may be printed over receiver layers 710, 710', respectively, with a desktop (e.g., D2T2) printer or large in-line printer or laminator (e.g., Datacard MX-6100).

Figure 8:
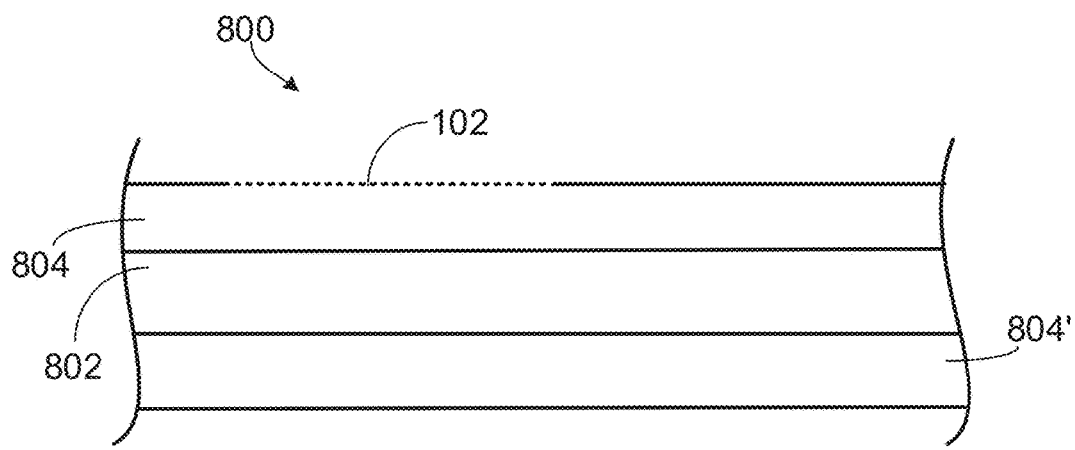
FIG. 8 depicts a cross-sectional view of a centrally issued card with a signature panel.

In some implementations, a signature panel may be formed in a CI card, such as exemplary CI card 800 depicted in FIG. 8. FIG. 8 is a cross-sectional view of card 800 (e.g., a CI ID document or a CI payment card) taken through signature panel 102 formed in the outer surface of the card 800. Card 800 includes core layer 802 sandwiched between layers 804 and 804'. Core layer 802 is typically an opaque material (also referred to as "substrate"), such as paper or plastic. Core layer 802 may include fixed and variable data, such as a color portrait, text, 2-D barcode, and the like. Layers 804 and 804' are typically clear plastic laminate that serve to protect the aforementioned items of information from wear, exposure to the elements and tampering. The thickness of layers 804 and 804' is not critical, although in some implementations it may be preferred that the thickness of a laminate layer be about 1-20 mil (about 25-500 μm). In one example, a thickness of layers 804 and 804' is about 10 mil. Examples of suitable laminates include polyester, polycarbonate (PC), polystyrene, cellulose ester, polyolefin, polysulfone, polyamide, polyvinyl chloride, and acrylonitrile butadiene styrene. Laminates can be made using either an amorphous polymer (e.g., amorphous polyester) or biaxially oriented polymer (e.g., oriented polyester). Signature panel 102 defines one or more depressions in layer 804.

While many of the figures shown herein illustrate a particular example of an ID document (e.g., a driver license) or payment card, the scope of this disclosure is not so limited. Rather, methods and techniques described herein apply generally to all ID documents and payment cards defined above. Moreover, techniques described herein are applicable to non-ID documents, such as adding signature panels to non-ID documents. Further, instead of ID documents or payment cards, the techniques described herein can be employed with product tags, product packaging, business cards, bags, charts, maps, labels, etc. The terms ID document and payment card are broadly defined herein to include these tags, labels, packaging, cards, etc. In addition, while some of the examples above are disclosed with specific core components, it is noted that laminates can be sensitized for use with other core components. For example, it is contemplated that aspects described herein may have applicability for articles and devices such as compact disks, consumer products, knobs, keyboards, electronic components, decorative or ornamental articles, promotional items, currency, bank notes, checks, or any other suitable items or articles that may record information, images, and/or other data, which may be associated with a function and/or an object or other entity to be identified.

Further modifications and alternative implementations of various aspects will be apparent to those skilled in the art in view of this description. Accordingly, this description is to be construed as illustrative only. It is to be understood that the forms shown and described herein are to be taken as examples of implementations. Elements and materials may be substituted for those illustrated and described herein, parts and processes may be reversed, and certain features may be utilized independently, all as would be apparent to one skilled in the art after having the benefit of this description.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of submodules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application specific integrated circuit.

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media (transitory or non-transitory, as appropriate) suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a subcombination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. The computer-implemented method for forming a signature panel in a surface of an identification document, the method being executed by one or more processors and comprising:
   generating, by the one or more processors, a digital grayscale image defining a pixel pattern; and
   causing, by the one or more processors, irradiation of the surface of the identification document using the digital grayscale image as a guide to form a signature panel in the surface of the identification document,
   wherein irradiation of the surface of the identification document forms one or more depressions in a region of the surface of the identification document corresponding to the signature panel, and
   wherein the one or more depressions are configured to receive ink applied to the signature panel.

2. The computer-implemented method of claim 1, wherein causing irradiation of the surface of the identification document comprises ablating one or more regions of the surface of the identification document.

3. The computer-implemented method of claim 1, wherein causing irradiation of the surface of the identification document comprises applying laser irradiation to one or more regions of the surface of the identification document.

4. The computer-implemented method of claim 1, wherein using the digital grayscale image as a guide to form a signature panel in the surface of the identification document comprises irradiating one or more regions of the surface of the identification document corresponding to a subset of pixels of the digital grayscale image.

5. The computer-implemented method of claim 1, wherein using the digital grayscale image as a guide to form a signature panel in the surface of the identification document comprises irradiating one or more regions of the surface of the identification document corresponding to pixels of the digital grayscale image identified as dark.

6. The computer-implemented method of claim 1, wherein using the digital grayscale image as a guide to form a signature panel in the surface of the identification document comprises:
   irradiating a first region of the surface using a first level of energy, the first region corresponding to a first subset of pixels of the digital grayscale image identified as first color; and
   irradiating a second region of the surface using a second level of energy, the second region corresponding to a second subset of pixels of the digital grayscale image identified as second color.

7. The method of claim 1, wherein irradiation of the surface of the identification document increases an effective surface area of the region of the surface of the identification document corresponding to the signature panel.

8. The method of claim 1, wherein irradiation of the surface of the identification document causes oxidation of the region of the surface of the identification document corresponding to the signature panel.

9. The method of claim 1, wherein irradiation of the surface of the identification document increases a surface tension of the region of the surface of the identification document corresponding with the signature panel.

* * * * *